(No Model.)
J. F. TAYLOR.
SULKY CULTIVATOR.
No. 461,290. Patented Oct. 13, 1891.
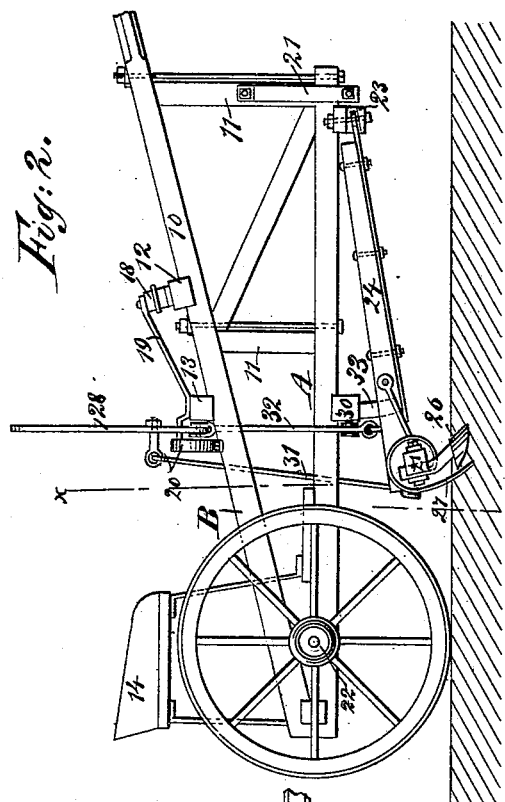
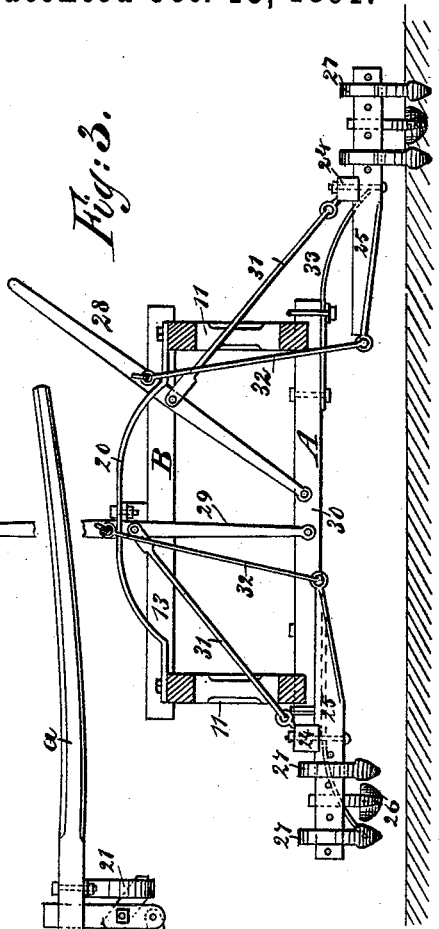
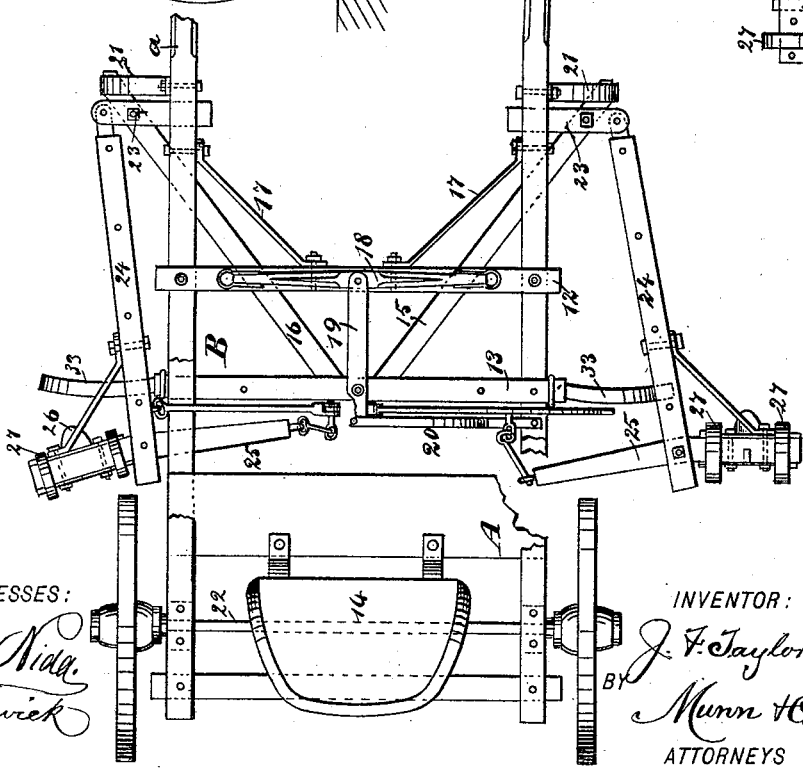
WITNESSES:
Chas. Nidd.
C. Sedgwick.
INVENTOR:
J. F. Taylor
BY Munn & Co.
ATTORNEYS

UNITED STATES PATENT OFFICE.

JOHN F. TAYLOR, OF WEST PARK, NEW YORK.

SULKY-CULTIVATOR.

SPECIFICATION forming part of Letters Patent No. 461,290, dated October 13, 1891.

Application filed March 31, 1891. Serial No. 387,109. (No model.)

*To all whom it may concern:*

Be it known that I, JOHN F. TAYLOR, of West Park, in the county of Ulster and State of New York, have invented a new and useful Sulky-Cultivator, of which the following is a full, clear, and exact description.

My invention relates to an improved sulky-cultivator especially adapted for the cultivation of grape-vines, and has for its object to provide an implement capable of effectually breaking the ground close to and between the vines and their posts.

A further object of the invention is to so construct the cultivator that the teeth or plows may be quickly and conveniently adjusted laterally to or from the main frame, thus enabling them to travel over the ground between the vines and posts and to loosen the ground near the vines and posts without disturbing the vines.

Another object of the invention is to provide a means whereby the teeth or plows will be firmly held in both the outer and the inner positions.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the implement.
Fig. 2 is a side elevation thereof, and Fig. 3 is vertical section on the line $x\ x$ of Fig. 2.

The main frame A of the implement is preferably made rectangular and is adapted to be normally held in a horizontal position parallel with the ground over which the implement is to pass. An upper frame B is also provided, the side pieces 10 whereof extend from the back of the main frame A, with which they are connected, and upward and forward beyond the main frame, the extensions of the side pieces beyond the lower or main frame being utilized as shafts, as illustrated at $a$ in Fig. 1. The side pieces 10 of the upper inclined frame B are supported by means of uprights 11, as illustrated in Fig. 2, and the upper frame is preferably provided with two cross-bars 12 and 13.

The driver's seat 14 is located at the rear of the implement, and is attached to the lower or main frame A. The lower or main frame is provided with two diagonal brace-beams 15 and 16, which extend from a point near its center forwardly in opposite directions beyond the sides of the main frame, as illustrated in Fig. 1. The cross-bar 12 of the upper frame is usually connected with the side beams 10 of the upper frame through the medium of brace-bars 17, and upon the said cross-bar a whiffletree 18 is pivoted.

A strap 19 connects the two upper cross-bars 12 and 13, and projects rearward of the latter bar, being adapted to support the central portion of an arched guide-bar or rack 20, the ends whereof are secured to the side beams of the upper frame. Brackets 21 are utilized to support the outer projecting ends of the diagonal brace-beams 15 and 16, and the brace-beams are preferably secured to the under surface of the lower frame A.

The axle 22, upon which the supporting-wheels are journaled, is located near the rear of the implement, and immediately back of the brackets 21 horizontal plates or bars 23 are located, which extend some distance outward beyond the sides of the lower or main frame A.

The plates or bars 23 are bolted to the diagonal brace-beams 15 and 16, and to the outer end of each bar or plate 23 the forward end of a swinging beam 24 is pivoted. The swinging beams extend rearward and have attached to their rear ends cross-beams 25, and that portion of the cross-beams 25 extending beyond the outer side faces of the swinging beams 24 is at a right angle to the line of draft, and the portions of the beams 25 extending beyond the inner side faces of the swinging beams are carried inward and slightly rearward, as is best shown in Fig. 1.

One or more shovels, shares, or teeth 26 is or are attached to the outer end of each of the beams 25, and at each side of each shovel, share, or tooth a spring-tooth 27 is located, adapted to break the ground turned up by the shovel or share 26, near which they are located.

The swinging beams 24 are operated through the medium of two levers 28 and 29, said levers being pivoted at their lower ends to a cross-beam 30, forming a portion of the lower or main frame. Each of the levers extends upward between the upper cross-beam 13 and the guide-bar or rack 20, as is best shown in Fig. 3. Each lever is connected by a link 31 with one of the swinging beams 24 near the rear ends of the latter, the links being pivotally connected with the levers near their central portions; and the swinging toothed frames are further attached to the levers 28 and 29 through the medium of links 32, the latter links being pivotally attached to the levers above the connection therewith of the links 31, and are attached to the inner extremities of the transverse beams 25 of the toothed frames, as shown in Figs. 1 and 3. The link connection 32 serves to equalize and steady the movements of the toothed frames.

In order that the toothed frames may be lifted out of the ground evenly and supported in such position close to the body of the implement or held in the ground some distance beyond the sides of said body, downwardly-curved supporting or guide bars or plates 33 are preferably attached to the under face of the cross-beam 30 of the main frame and extend outward from each side of the main frame, as is best shown in Figs. 1 and 3.

When the toothed frame is swung outward to enter the ground, the beam 24 of the frame will rest upon the outer extremity of the curved guide-bar 33, as illustrated at the right in Fig. 3, and is effectually prevented from working inward. When, however, it is desired to draw the swinging frame inward, the beam 24 of the frame, when tension is exerted thereon by its attached lever, is drawn upward over the convexed surface of the guide-bar, and when the frame is in its innermost position the beam 24 rests upon the inner surface of the guide-bar, as shown at the left in Fig. 3, and by this means a positive and regular movement of the swinging frame is secured, and the necessity for a lock for the levers is dispensed with.

In the operation of cultivating a vineyard the swinging frame nearest to the row of vines to be cultivated is swung outward while the implement is passing between the vines and posts. Thus the cultivator-teeth travel between the vines and posts practically in alignment therewith, and when a post or vine is approached sufficiently close the operator, by manipulating one of the levers, may draw the swinging frame inward a sufficient distance to enable the teeth carried thereby to leave the ground.

The implement is exceedingly simple and durable in construction, and will cultivate grape or similar vines expeditiously, economically, and effectively.

Having thus described my invention, I claim as new and desire to secure by Letters Patent—

1. A cultivator comprising the main frame, the laterally-swinging auxiliary cultivator-frames pivoted at their forward ends to the outer sides of the main frame, transversely-swinging levers pivoted at their lower ends to the main frame, and two links 31 32, connecting each lever between its ends with the adjacent swinging frame at different points, substantially as set forth.

2. In a cultivator, the combination, with a main frame, of a tooth-carrying frame pivoted at its forward end, one at each side of the main frame, levers attached to the main frame, and link connections between the levers and the swinging frames, as and for the purpose specified.

3. In a cultivator, the combination, with a main frame provided with a curved guide-bar projected from its side, of a toothed frame pivotally connected at its forward end to the main frame, adapted for engagement with and to move upon the guide-bar, a lever pivoted upon the main frame, and a connection between said lever and the swinging frame, as and for the purpose set forth.

4. In a cultivator, the combination, with a main frame and downwardly-curved guide-bars projected from the sides thereof, of toothed carrying-frames pivoted at their forward ends to the main frame and adapted for engagement with and to slide upon the guide-bars, and shares, teeth, or shovels attached to the swinging frames, spring-teeth located at the sides of the cultivating shovels, shares, or teeth, levers pivoted upon the main frame, and link connections between said levers and the swinging frames, as and for the purpose specified.

JOHN F. TAYLOR.

Witnesses:
J. FRED. ACKER,
C. SEDGWICK.